US011922289B1

(12) United States Patent
Segars et al.

(10) Patent No.: US 11,922,289 B1
(45) Date of Patent: Mar. 5, 2024

(54) MACHINE LEARNING-BASED SYSTEMS AND METHODS FOR ON-DEMAND GENERATION OF ANONYMIZED AND PRIVACY-ENABLED SYNTHETIC DATASETS

(71) Applicant: Subsalt Inc., Charlotte, NC (US)

(72) Inventors: Luke Segars, Seattle, WA (US); Dylan Moradpour, Baltimore, MD (US); Ben Winokur, Charlotte, NC (US); David Singletary, Charlotte, NC (US)

(73) Assignee: Subsalt Inc., Charlotte, NC (US)

( * ) Notice: Subject to any disclaimer, the term of this patent is extended or adjusted under 35 U.S.C. 154(b) by 0 days.

(21) Appl. No.: 18/238,840

(22) Filed: Aug. 28, 2023

Related U.S. Application Data

(60) Provisional application No. 63/402,047, filed on Aug. 29, 2022.

(51) Int. Cl.
| | |
|---|---|
| *G06N 3/0455* | (2023.01) |
| *G06F 16/2457* | (2019.01) |
| *G06F 16/2458* | (2019.01) |
| *G06N 3/0475* | (2023.01) |
| *G06N 3/094* | (2023.01) |

(52) U.S. Cl.
CPC ..... *G06N 3/0455* (2023.01); *G06F 16/24578* (2019.01); *G06F 16/2471* (2019.01); *G06N 3/0475* (2023.01); *G06N 3/094* (2023.01)

(58) Field of Classification Search
CPC .... G06N 3/0455; G06N 3/094; G06N 3/0475; G06F 16/24578; G06F 16/2471
See application file for complete search history.

(56) References Cited

U.S. PATENT DOCUMENTS

| | | | | |
|---|---|---|---|---|
| 2004/0189691 | A1* | 9/2004 | Jojic | G11B 27/005 715/838 |
| 2020/0012892 | A1* | 1/2020 | Goodsitt | G06F 16/2264 |
| 2023/0185998 | A1* | 6/2023 | Matei | G06F 30/27 703/2 |

* cited by examiner

*Primary Examiner* — Etienne P Leroux
(74) *Attorney, Agent, or Firm* — Padowithz Alce; Quintin Scheitlin; Alce PLLC

(57) ABSTRACT

A system and method for generating synthetic datasets includes receiving, via an application programming interface (API) of a remote generative database service, a generative database query for obtaining synthetic data samples statistically representative of a sensitive dataset, searching a generative model data structure comprising a plurality of generative model nexuses based on a generative model election request derived from the generative database query, wherein the searching returns a generative model for fulfilling the generative database query, generating a synthetic dataset using the generative model returned from the searching based on a plurality of generative query parameters extracted from the generative database query, and returning the synthetic dataset as a result to the generative database query.

20 Claims, 6 Drawing Sheets

200

```
Sourcing Training Data
S210
```

```
Training a Plurality of Generative Models
S220
```

```
Constructing a Routing-Informative Generative Model
Matrix
S230
```

```
Instantiating a Generative Database
S240
```

```
Querying the Generative Database
S250
```

FIGURE 2

MACHINE LEARNING-BASED SYSTEMS AND METHODS FOR ON-DEMAND GENERATION OF ANONYMIZED AND PRIVACY-ENABLED SYNTHETIC DATASETS

CROSS-REFERENCE TO RELATED APPLICATIONS

This application claims the benefit of U.S. Provisional Application No. 63/402,047, filed on 29 Aug. 2022, which is incorporated in its entirety by this reference.

TECHNICAL FIELD

This invention relates generally to the synthetic data field and, more specifically, to a new and useful system and method for configuring and querying a generative database.

BACKGROUND

An increasing number of businesses are seeking to make data-driven decisions. Unfortunately, many of these businesses often face regulatory, privacy, compliance, and/or legal hurdles when attempting to provide in-house or outside researchers with access to sensitive datasets (e.g., datasets containing personally identifiable information (PII), protected health information (PHI), etc.).

Overcoming these hurdles often require personnel—who have access to the sensitive datasets—to perform manual, time intensive data de-sensitization tasks that may take weeks or months to complete. Such a delay seriously hinders a business's ability to perform data modeling and/or data analysis tasks in a timely manner.

Accordingly, it is advantageous to have systems and methods that automatically generate synthetic, privacy-preserving versions of these sensitive datasets. The embodiments of the present application, described herein, provide technical solutions that at least address the needs described above, as well as the deficiencies of the state of the art.

BRIEF SUMMARY OF THE INVENTION(S)

In some embodiments, a method for on-demand generation of anonymized and privacy-compliant synthetic datasets includes: identifying, via one or more computers, a generative database query for obtaining synthetic data samples statistically representative of a target sensitive dataset; constructing, via the one or more computers, a generative model election request based on the generative database query, wherein the generative model election request, once constructed, includes (1) a plurality of synthetization-informative query parameters extracted from the generative database query and (2) a synthetization objective of the generative database query; searching, via the one or more computers, a generative model election data structure comprising a plurality of generative model-to-synthetization efficacy data nexuses based on the generative model election request, wherein searching the generative model election data structure includes: defining, via the one or more computers, a generative model election search query using model election criteria derived from at least the synthetization objective and the plurality of synthetization-informative query parameters, searching, via the one or more computers, the generative model election data structure for one or more generative model-to-synthetization efficacy data nexuses that satisfy the model election criteria of the generative model election search query, and electing, via the one or more computers, a generative model for fulfilling the generative database query based on an assessment of synthetization efficacy data included in each of the one or more generative model-to-synthetization efficacy data nexuses; generating, via the one or more computers, a synthetic dataset using the generative model elected for fulfilling the generative database query based at least on a subset of the plurality of synthetization-informative query parameters extracted from the generative database query, wherein the synthetic dataset, once generated, comprises the synthetic data samples statistically representative of the target sensitive dataset; and returning, via the one or more computers, the synthetic dataset as a result to the generative database query.

In some embodiments, the plurality of synthetization-informative query parameters extracted from the generative database query comprise a set of synthetic data columns requested in the generative database query, each generative model-to-synthetization efficacy data nexus of the generative model election data structure (a) corresponds to a generative model trained on the target sensitive dataset and (b) includes column-level synthetization efficacy metrics for each synthetic data column that the generative model synthesizes, and electing the generative model from the one or more generative model-to-synthetization efficacy data nexuses includes: identifying, in each of the one or more generative model-to-synthetization efficacy data nexuses, the column-level synthetization efficacy metrics that correspond to the set of synthetic data columns requested in the generative database query; calculating a distinct aggregate column synthetization score for the generative model associated with each of the one or more generative model-to-synthetization efficacy data nexuses based on the identifying; and comparing the distinct aggregate column synthetization score calculated for the generative model corresponding to each of the one or more generative model-to-synthetization efficacy data nexuses; and electing a generative model with a greatest aggregate column synthetization score as the generative model for fulfilling the generative database query.

In some embodiments, each generative model-to-synthetization efficacy data nexus includes a plurality of column-level synthetization efficacy metrics for each synthetic data column that a corresponding target generative model synthesizes, the plurality of column-level synthetization efficacy metrics associated with a target synthetic data column each correspond to a distinct synthetization objective of a plurality of synthetization objectives, and when the synthetization objective of the generative database query corresponds to a first synthetization objective, identifying the column-level synthetization efficacy metrics includes identifying, in each of the one or more generative model-to-synthetization efficacy data nexuses, column-level synthetization efficacy metrics that correspond to the first synthetization objective for the set of synthetic data columns requested in the generative database query; and calculating the distinct aggregate column synthetization score for the generative model associated with each of the one or more generative model-to-synthetization efficacy data nexuses based on the identifying of the column-level synthetization efficacy metrics that correspond to the first synthetization objective.

In some embodiments, when the synthetization objective of the generative database query corresponds to a second synthetization objective, aggregating the column-level synthetization efficacy metrics includes: identifying, in each of the one or more generative model-to-synthetization efficacy data nexuses, column-level synthetization efficacy metrics that correspond to the second synthetization objective for the set of synthetic data columns requested in the generative database query; and calculating the distinct aggregate column synthetization score for the generative model associated with each generative model-to-synthetization efficacy data nexus based on the aggregating of the column-level synthetization efficacy metrics that correspond to the second synthetization objective.

In some embodiments, each generative model-to-synthetization efficacy data nexus of the generative model election data structure further includes table-level synthetization efficacy metrics that aggregate a distinct set of the column-level synthetization efficacy metrics included in a target generative model-to-synthetization efficacy data nexus, and the generative model elected for fulfilling the generative database query corresponds to one of: (1) a generative model with a greatest table-level synthetization efficacy metric or (2) the generative model with the greatest aggregate column synthetization score.

In some embodiments, a generative database comprising a plurality of generative models receives the generative database query, each of the plurality of generative model-to-synthetization efficacy data nexuses digitally associates a distinct generative model of the plurality of generative models with distinct synthetization efficacy metric data that indicates a likely synthetization performance of the distinct generative model for a plurality of synthetization objectives, and the generative model elected for fulfilling the generative database query is selected from a set of the plurality of generative models having synthetization efficacy metric data satisfying at least a minimum generative model performance threshold for the synthetization objective of the generative database query.

In some embodiments, the synthetization objective of the generative database query relates to a user intent with the synthetic dataset, the synthetization objective is sourced from a user associated with the generative database query via a graphical user interface, and the synthetization objective relates to at least one of: training a machine learning classification model using the synthetic dataset, training a machine learning binary classification model using the synthetic dataset, training a machine learning regression model using the synthetic dataset, and exploring one or more feature correlations within the synthetic dataset.

In some embodiments, the generative database query comprises a plurality of generative query parameters specified in structured query language (SQL) syntax, the generative model election request, once constructed, further includes a name of a generative database and a name of a generative database table extracted from the SQL syntax. In some embodiments, the method further comprises identifying the generative model election data structure from a generative model election data structure registry based on a determination that the generative model election data structure includes generative model ranking data for the generative database and the generative database table.

In some embodiments, a generative database service comprising a plurality of generative databases receives the generative database query via an application programming interface (API), and the plurality of generative databases of the generative database service are each associated with one or more generative database tables.

In some embodiments, the target sensitive dataset comprises sensitive medical record data of one or more patients, the generative database query queries a generative database comprising a plurality of generative models trained on at least a subset of the sensitive medical record data, and the synthetic dataset provided as the result to the generative database query de-identifies and anonymizes the sensitive medical record data, thereby preserving patient privacy and confidentiality.

In some embodiments, the plurality of synthetization-informative query parameters extracted from the generative database query specifies: a total number of synthetic rows to synthesize; a set of synthetic data columns to synthesize; and data synthesis conditions of the generative database query, and generating the synthetic dataset via the generative model elected for the generative database query includes: constructing a generative model input based on the total number of synthetic rows, the set of synthetic data columns, and the data synthesis conditions, providing the generative model input to the generative model, and generating the synthetic dataset based on the generative model receiving the generative model input.

In some embodiments, configuring a generative database to receive the generative database query, wherein configuring the generative database includes: sourcing, via the one or more computers, the target sensitive dataset from a user, training, via the one or more computers, a plurality of generative models based on the target sensitive dataset, constructing, via the one or more computers, the generative model election data structure based on a plurality of synthetization efficacy metrics computed for the plurality of generative models, associating, via the one or more computers, the generative model election data structure with the generative database, wherein the associating enables the generative database to search the generative model election data structure in response to receiving the generative database query, and defining, via the one or more computers, a generative database query interface that enables the user to submit the generative database query.

In some embodiments, the generative database relates to a virtual representation of a data structure comprising one or more rows and columns that interfaces with at least a subset of the plurality of generative models trained on the target sensitive dataset to fulfill the generative database query, and the generative database dynamically generates the synthetic dataset by invoking the subset of the plurality of generative models with an input based on at least a subset of the plurality of synthetization-informative query parameters.

In some embodiments, training the plurality of generative models on the target sensitive dataset includes: training a plurality of generative adversarial networks (GANs) on the target sensitive dataset, wherein at least a subset of the plurality of generative adversarial networks differ in at least one of model architecture, hyperparameters, and training data.

In some embodiments, the generative database, once configured, synthesizes data samples for a plurality of synthetization objectives including a classification-related synthetization objective, and constructing the generative model election data structure includes: training a plurality of synthetic machine learning classifiers using synthetic data samples produced by a respective generative model of the plurality of generative models, training a distinct machine learning classifier using sensitive data samples included in the target sensitive dataset, determining a synthetic machine learning classifier of the plurality of synthetic machine learning classifiers that performs closest to the distinct machine learning classifier trained on the sensitive data samples, and selecting the respective generative model associated with the synthetic machine learning classifier that performs closest to the distinct machine learning classifier as an optimal generative model for the classification-related synthetization objective.

In some embodiments, determining the synthetic machine learning classifier of the plurality of synthetic machine learning classifiers that performs closest to the distinct machine learning classifier trained on the sensitive data samples includes: computing a plurality of synthetic F1 score model efficacy metrics for the plurality of synthetic machine learning classifiers trained on the synthetic data samples based on predictive inferences of the plurality of synthetic machine learning classifiers on a validation dataset derived from the target sensitive dataset, computing a raw data F1 score model efficacy metric for the distinct machine learning classifier trained on the sensitive data samples based on predictive inferences of the distinct machine learning classifier on the validation dataset derived from the target sensitive dataset, computing a plurality of derivative synthetization efficacy metrics based on a difference between the raw data F1 score model efficacy metric and a distinct one of the plurality of synthetic F1 score model efficacy metrics, and selecting a synthetic machine learning classifier associated with a smallest derivative synthetization efficacy metric as the synthetic machine learning classifier that performs closest to the distinct machine learning classifier trained on the sensitive data samples.

In some embodiments, the generative database, once configured, synthesizes data samples for a plurality of synthetization objectives including a regression-based synthetization objective, constructing the generative model election data structure: training a plurality of synthetic machine learning regression models using synthetic data samples produced by a respective generative model of the plurality of generative models, training a distinct machine learning regression model using sensitive data samples included in the target sensitive dataset, determining a synthetic machine learning regression model of the plurality of synthetic machine learning regression models that performs closest to the distinct machine learning regression model trained on the sensitive data samples, and selecting the respective generative model associated with the synthetic machine learning regression model that performs closest to the distinct machine learning classifier trained on the sensitive data samples as an optimal generative model for the regression-based synthetization objective.

In some embodiments, determining the synthetic machine learning regression model of the plurality of synthetic machine learning regression models that performs closest to the distinct machine learning regression model trained on the sensitive data samples includes: computing a plurality of synthetic mean squared error (MSE) model efficacy metrics for the plurality of synthetic machine learning regression models trained on the synthetic data samples based on predictive inferences of the plurality of synthetic machine learning regression models on a validation dataset derived from the target sensitive dataset, computing a raw data mean squared error (MSE) model efficacy metric for the distinct machine learning regression model trained on the sensitive data samples based on predictive inferences of the distinct machine learning regression model on the validation dataset derived from the target sensitive dataset, computing a plurality of derivative synthetization efficacy metrics based on a difference between the raw data MSE model efficacy metric and a distinct one of the plurality of synthetic MSE model efficacy metrics, and selecting a synthetic machine learning regression model associated with a smallest derivative synthetization efficacy metric as the synthetic machine learning regression model that performs closest to the distinct machine learning regression model trained on the sensitive data samples.

In some embodiments, a computer-implemented method for generating synthetic datasets comprises receiving, via an application programming interface (API) of a remote generative database service, a generative database query for obtaining synthetic data samples statistically representative of a sensitive dataset; searching a generative model data structure comprising a plurality of generative model nexuses based on a generative model election request derived from the generative database query, wherein the searching returns a generative model for fulfilling the generative database query; generating a synthetic dataset using the generative model returned from the searching based on a plurality of generative query parameters extracted from the generative database query; and returning the synthetic dataset as a result to the generative database query.

In some embodiments, each of the plurality of generative model nexuses included in the generative model election data structure digitally associates a distinct generative model with model ranking data that ranks a likely synthetization performance of a plurality of generative models for a plurality of synthetization objectives, and the generative model elected from the searching of the generative model election data structure corresponds to a highest-ranked generative model for the synthetization objective of the generative database query.

In some embodiments, a method for on-demand generation of anonymized and privacy-compliant synthetic datasets comprises identifying, via one or more computers, a generative database query for obtaining synthetic data samples statistically representative of a target sensitive dataset; constructing, via the one or more computers, a generative model election request based on the generative database query, wherein the generative model election request, once constructed, includes (1) a plurality of synthetization-informative query parameters extracted from the generative database query and (2) a synthetization objective of the generative database query; searching, via the one or more computers, a generative model election data structure comprising a plurality of synthetization objective-to-generative model nexuses based on the generative model election request, wherein searching the generative model election data structure includes: defining, via the one or more computers, a generative model nexus search query using at least the synthetization objective as a search parameter, searching, via the one or more computers, the generative model election data structure for a synthetization objective-to-generative model nexus that satisfies search parameters of the generative model nexus search query, and electing, via the one or more computers, a generative model for fulfilling the generative database query based on the synthetization objective-to-generative model nexus identified from the searching; generating, via the one or more computers, a synthetic dataset using the generative model elected for the generative database query based at least on a subset of the plurality of synthetization-informative query parameters extracted from the generative database query, wherein the synthetic dataset, once generated, comprises the synthetic data samples statistically representative of the target sensitive dataset; and returning, via the one or more computers, the synthetic dataset as a result of the generative database query.

In some embodiments, a generative database comprising a plurality of generative models receives the generative database query, each of the plurality of synthetization objective-to-generative model nexuses included in the generative model election data structure digitally associates a distinct synthetization objective with model ranking data that ranks a likely synthetization performance of the plurality of generative models for the distinct synthetization objective, and the generative model elected for fulfilling the generative database query corresponds to a highest-ranked generative model within the model ranking data associated with the synthetization objective.

In some embodiments, the synthetization objective of the generative database query relates to a user intent with the synthetic dataset, the synthetization objective is sourced from a user associated with the generative database query via a graphical user interface, and the synthetization objective relates to at least one of: training a machine learning classification model using the synthetic dataset, training a machine learning binary classification model using the synthetic dataset, training a machine learning regression model using the synthetic dataset, and exploring one or more feature correlations within the synthetic dataset.

In some embodiments, the generative database query comprises a plurality of generative query parameters specified in structured query language (SQL) syntax, the generative model election request, once constructed, further includes a name of a generative database and a name of a generative database table extracted from the SQL syntax. In some embodiments, the method includes identifying the generative model election data structure from a generative model election data structure registry based on a determination that the generative model election data structure includes generative model ranking data for the generative database and the generative database table.

In some embodiments, a generative database service comprising a plurality of generative databases receives the generative database query via an application programming interface (API), and the plurality of generative databases of the generative database service are each associated with one or more generative database tables.

In some embodiments, the target sensitive dataset comprises sensitive medical record data of one or more patients, the generative database query queries a generative database comprising a plurality of generative models trained on at least a subset of the sensitive medical record data, and the synthetic dataset provided as the result to the generative database query de-identifies and anonymizes the sensitive medical record data, thereby preserving patient privacy and confidentiality.

In some embodiments, the plurality of synthetization-informative query parameters extracted from the generative database query specifies: a total number of synthetic rows to synthesize; a set of synthetic data columns to synthesize; and data synthesis conditions of the generative database query, and generating the synthetic dataset via the generative model elected for the generative database query includes: constructing a generative model input based on the total number of synthetic rows, the set of synthetic data columns, and the data synthesis conditions, providing the generative model input to the generative model, and generating the synthetic dataset based on the generative model receiving the generative model input.

In some embodiments, the method further includes configuring a generative database to receive the generative database query, wherein configuring the generative database includes: sourcing, via the one or more computers, the target sensitive dataset from a user, training, via the one or more computers, a plurality of generative models based on the target sensitive dataset, constructing, via the one or more computers, the generative model election data structure based on a plurality of synthetization efficacy metrics computed for the plurality of generative models, associating, via the one or more computers, the generative model election data structure with the generative database, wherein the associating enables the generative database to search the generative model election data structure in response to receiving the generative database query, and defining, via the one or more computers, a generative database query interface that enables the user to submit the generative database query.

In some embodiments, the generative database relates to a virtual representation of a data structure comprising one or more rows and columns that interfaces with at least a subset of the plurality of generative models trained on the target sensitive dataset to fulfill the generative database query, and the generative database dynamically generates the synthetic dataset by invoking the subset of the plurality of generative models with an input based on at least a subset of the plurality of synthetization-informative query parameters.

In some embodiments, training the plurality of generative models includes training a plurality of generative adversarial networks (GANs), wherein at least a subset of the plurality of generative adversarial networks differ in at least one of model architecture, hyperparameters, and training data.

In some embodiments, the generative database is configured to synthesize data samples for a plurality of synthetization objectives including a classification-related synthetization objective, constructing the generative model election data structure includes constructing a synthetization objective-to-generative model nexus for the classification-related synthetization objective, and constructing the synthetization objective-to-generative model nexus for classification-related synthetization objective includes: training a plurality of synthetic machine learning classifiers using synthetic data samples produced by a respective generative model of the plurality of generative models, training a distinct machine learning classifier using sensitive data samples included in the target sensitive dataset, determining a synthetic machine learning classifier of the plurality of synthetic machine learning classifiers that performs closest to the distinct machine learning classifier trained on the sensitive data samples, and selecting the respective generative model associated with the synthetic machine learning classifier that performs closest to the distinct machine learning classifier as an optimal generative model for the classification-related synthetization objective.

In some embodiments, determining the synthetic machine learning classifier of the plurality of synthetic machine learning classifiers that performs closest to the distinct machine learning classifier trained on the sensitive data samples includes: computing a plurality of synthetic F1 score model efficacy metrics for the plurality of synthetic machine learning classifiers trained on the synthetic data samples based on predictive inferences of the plurality of synthetic machine learning classifiers on a validation dataset derived from the target sensitive dataset, computing a raw data F1 score model efficacy metric for the distinct machine learning classifier trained on the sensitive data samples based on predictive inferences of the distinct machine learning classifier on the validation dataset derived from the target sensitive dataset, computing a plurality of derivative synthetization efficacy metrics based on a difference between the raw data F1 score model efficacy metric and a distinct one of the plurality of synthetic F1 score model efficacy metrics, and selecting a synthetic machine learning classifier associated with a smallest derivative synthetization efficacy metric as the synthetic machine learning classifier that performs closest to the distinct machine learning classifier trained on the sensitive data samples.

In some embodiments, the generative database is configured to synthesize data samples for a plurality of synthetization objectives including a regression-based synthetization objective, constructing the generative model election data structure includes constructing a synthetization objective-to-generative model nexus for the regression-based synthetization objective, and constructing the synthetization objective-to-generative model nexus for regression-based synthetization objective includes: training a plurality of synthetic machine learning regression models using synthetic data samples produced by a respective generative model of the plurality of generative models, training a distinct machine learning regression model using sensitive data samples included in the target sensitive dataset, determining a synthetic machine learning regression model of the plurality of synthetic machine learning regression models that performs closest to the distinct machine learning regression model trained on the sensitive data samples, and selecting the respective generative model associated with the synthetic machine learning regression model that performs closest to the distinct machine learning classifier trained on the sensitive data samples as an optimal generative model for the regression-based synthetization objective.

In some embodiments, determining the synthetic machine learning regression model of the plurality of synthetic machine learning regression models that performs closest to the distinct machine learning regression model trained on the sensitive data samples includes: computing a plurality of synthetic mean squared error (MSE) model efficacy metrics for the plurality of synthetic machine learning regression models trained on the synthetic data samples based on predictive inferences of the plurality of synthetic machine learning regression models on a validation dataset derived from the target sensitive dataset, computing a raw data mean squared error (MSE) model efficacy metric for the distinct machine learning regression model trained on the sensitive data samples based on predictive inferences of the distinct machine learning regression model on the validation dataset derived from the target sensitive dataset, computing a plurality of derivative synthetization efficacy metrics based on a difference between the raw data MSE model efficacy metric and a distinct one of the plurality of synthetic MSE model efficacy metrics, and selecting a synthetic machine learning regression model associated with a smallest derivative synthetization efficacy metric as the synthetic machine learning regression model that performs closest to the distinct machine learning regression model trained on the sensitive data samples.

In some embodiments, a computer-implemented method for generating synthetic datasets comprises receiving, via an application programming interface (API) of a remote generative database service, a generative database query for obtaining synthetic data samples statistically representative of a target sensitive dataset; searching a generative model data structure comprising a plurality of generative model nexuses based on a generative model election request derived from the generative database query, wherein searching the generative model data structure includes searching the generative model data structure for a generative model nexus of the plurality of generative model nexuses that corresponds to a synthetization objective of the generative database query, and identifying and electing a generative model associated with the generative model nexus based on an assessment of the generative model nexus; generating a synthetic dataset using the generative model elected for the generative database query based on a plurality of generative query parameters extracted from the generative database query; and returning the synthetic dataset as a result to the generative database query.

In some embodiments, the remote generative database service is configured to synthesize data samples for a plurality of synthetization objectives including a feature-modeling synthetization objective, constructing the generative model election data structure includes constructing a generative model nexus for the feature-modeling synthetization objective, and constructing the generative model nexus for the feature-modeling synthetization objective includes training a plurality of synthetic machine learning models using synthetic data samples produced by a respective generative model of a plurality of generative models trained on the target sensitive dataset, training a distinct machine learning model using sensitive data samples included in the target sensitive dataset, determining a synthetic machine learning model of the plurality of synthetic machine learning models that performs closest to the distinct machine learning model trained on the sensitive data samples, and selecting the respective generative model associated with the synthetic machine learning model that performs closest to the distinct machine learning model trained on the sensitive data samples as an optimal generative model for the feature-modeling synthetization objective.

In some embodiments, determining the synthetic machine learning model of the plurality of synthetic machine learning models that performs closest to the distinct machine learning model trained on the sensitive data samples includes: computing a plurality of synthetic mean absolute percentage squared error (MAPE) model efficacy metrics for the plurality of synthetic machine learning models trained on the synthetic data samples based on predictive inferences of the plurality of synthetic machine learning models on a validation dataset derived from the target sensitive dataset, computing a raw data synthetic mean absolute percentage squared error (MAPE) model efficacy metric for the distinct machine learning model trained on the sensitive data samples based on predictive inferences of the distinct machine learning model on the validation dataset derived from the target sensitive dataset, computing a plurality of derivative synthetization efficacy metrics based on a difference between the raw data MAPE model efficacy metric and a distinct one of the plurality of synthetic MAPE model efficacy metrics, and selecting a synthetic machine learning model associated with a smallest derivative synthetization efficacy metric as the synthetic machine learning model that performs closest to the distinct machine learning model trained on the sensitive data samples.

In some embodiments, each of the plurality of generative model nexuses included in the generative model election data structure digitally associates a distinct synthetization objective with model ranking data that ranks a likely synthetization performance of a plurality of generative models for the distinct synthetization objective, and the generative model elected from the searching of the generative model election data structure corresponds to a highest-ranked generative model for the synthetization objective of the generative database query.

In some embodiments, the target sensitive dataset comprises sensitive health data of one or more patients, the generative database query dynamically queries a generative database comprising a plurality of generative models trained on at least a subset of the sensitive health data, the synthetic dataset provided as the response to the generative database query de-identifies and anonymizes the sensitive health data, thereby preserving patient privacy and confidentiality.

In some embodiments, a computer-implemented method for generating synthetic datasets comprises: receiving a generative database query for obtaining synthetic data samples statistically representative of a sensitive dataset; searching a generative model data structure comprising a plurality of generative model nexuses based on a generative model election request derived from the generative database query, wherein the searching returns a generative model for fulfilling the generative database query; generating a synthetic dataset using the generative model returned from the searching based on a plurality of generative query parameters extracted from the generative database query; and returning the synthetic dataset as a result to the generative database query.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. Machine Learning-Based System for Generating Synthetic Datasets

Figure 1:
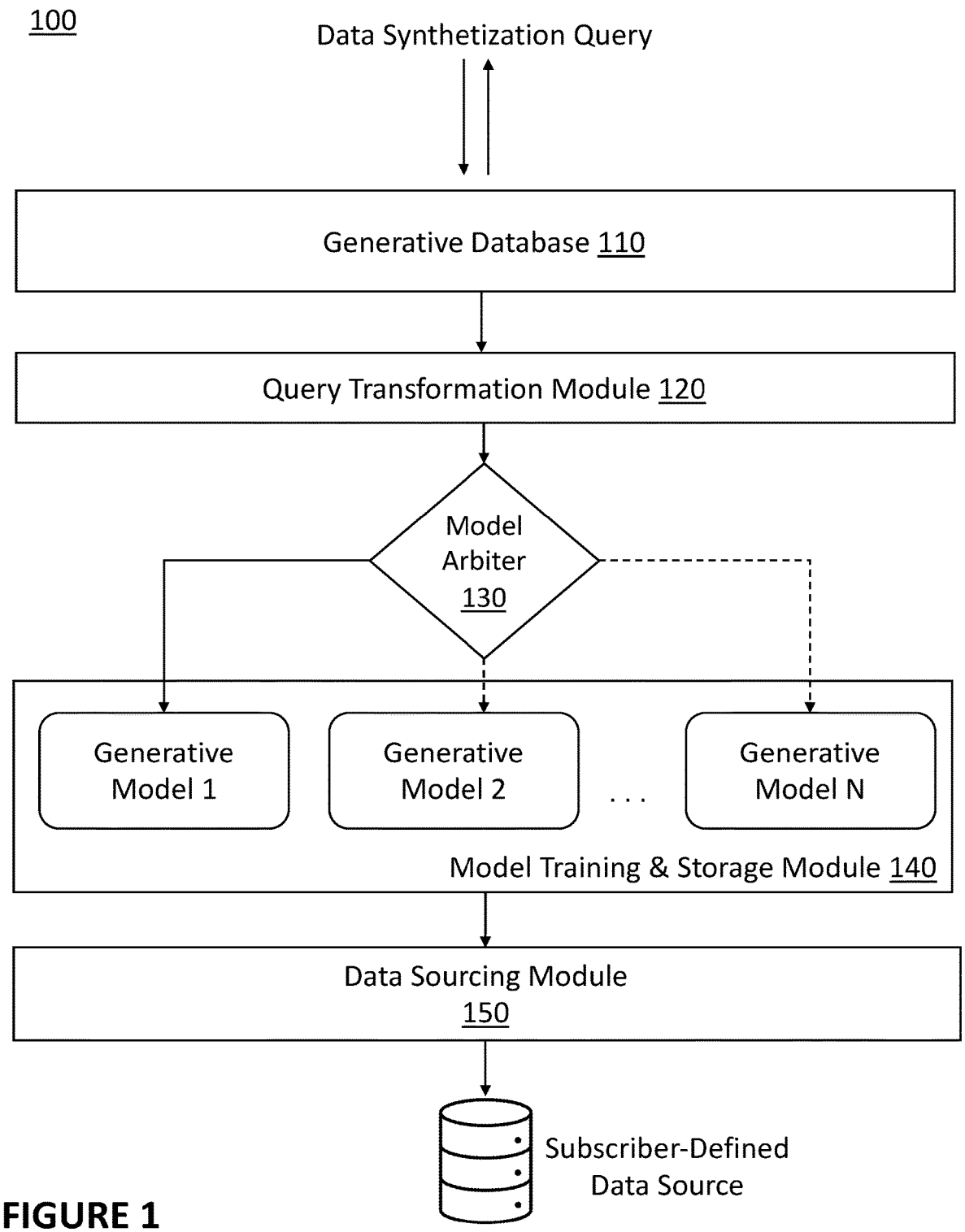
FIG. 1 illustrates a schematic representation of a system 100 in accordance with one or more embodiments of the present application.

As shown in FIG. 1, a system 100 for generating synthetic datasets may include a generative database 110, a query transformation module 120, a model arbiter 130, a model training and storage module 140, and a data sourcing module 150.

1.10 Generative Database

The generative database 110 may be a memory-less or storage-less database that, when queried, synthesizes one or more data samples via one or more generative models underpinning the generative database 110 (e.g., the generative models stored at the model training and storage module 140). In some examples, the system 100 may include a plurality of generative databases. Accordingly, in such examples, each generative database 110 in the system 100 may be associated with a same or different query transformation module 120, a same or different model arbiter 130, a same or different model training and storage module 140, and/or a same or different data sourcing module 150.

Furthermore, as shown in FIG. 1, in some examples, the generative database 110 may function to receive one or more data synthetization queries from one or more users. The one or more data synthetization queries may be composed in any suitable database query language/syntax including, but not limited to, SQL, NoSQL, SchemeQL, ScalaQL, and/or the like. Additionally, as also shown in FIG. 1, in some examples, the generative database 110 may function to pass (e.g., route) the one or more data synthetization queries to the query transformation module 120.

It shall be noted that, in some portions of the disclosure, the generative database 110 may also be referred to as a "query receiving module," "generative database interfacing layer," and/or the like.

1.20 Query Transformation Module

The query transformation module 120 may function to transform a received data synthetization query into a format and/or data structure that can be processed by one or more generative models (e.g., the generative models stored at the model training and storage module 140). In some examples, to transform a data synthetization query into a format and/or data structure that can be processed by a generative model, the query transformation module 120 may function to extract (or parse) attributes/properties of the received data synthetization query and, in turn, add/embed the extracted attributes/properties into a suitable model input data structure. Example attributes/properties that may be extracted from a data synthetization query may include, but should not be limited to, the name of the generative database being queried ("target generative database"), the name of the generative database table being queried ("target generative database table"), the database fields (e.g., columns) to synthesize, the number of data samples (e.g., rows) to synthesize, the conditions of the data synthetization query (e.g., WHERE clause in an SQL query), and/or the like.

Additionally, or alternatively, in some embodiments, to construct the model input data structure, the query transformation module 120 may function to collect (or derive) data related to a user who submitted the data synthetization query ("user context data") and, in turn, add/embed the collected user context data in the model input data structure. Example user context data that may be added to the model input data structure may include, but should not be limited to, an intent of the user who executed the data synthetization query ("data synthetization intent"), the queries previously executed by the user, the amount of synthetic data previously generated via the target generative database (e.g., by the user or by all the users of the system 100), the data synthetization intents of the user(s) when such previous synthetic data was generated, and/or the like.

It shall be noted that, in some examples, the data synthetization intent collected/derived by the query transformation module 120 may correspond to the user's intent with the synthetic data samples once synthesized (e.g., "general data exploration," "to understand relationships between certain data fields," "build a classifier," "predict/estimate a future value of a data field," and/or the like).

Furthermore, as also shown in FIG. 1, in some examples, the query transformation module 120 may additionally, or alternatively, function to route the transformed data synthetization query to the model arbiter 130.

1.30 Model Arbiter|Generative Model Election Data Structure Registry

The model arbiter 130 may function to receive a transformed data synthetization query and determine/select, among the generative models stored in the model training and storage module 140, the generative model(s) suitable/capable of handling the data synthetization query and, in turn, most optimal for handling the data synthetization query received by the generative database 110.

In some embodiments, to determine the generative model most suitable/optimal for processing a data synthetization query, the model arbiter 130 may function to construct a routing-informative generative model matrix (e.g., if one has not previously been constructed or identified). In a preferred embodiment, as described in more detail in the method 200, the routing-informative generative model matrix may comprise one or more lookup tables, one or more database tables, and/or the like that correlate possible data synthetization intents to an optimal generative model.

Accordingly, in such embodiments as described in more detail in the method 200, the model arbiter 130 may function to determine the generative model most optimal for a target data synthetization query by identifying the data synthetization intent of the target data synthetization query (as described with respect to module 120) and, in turn, searching the routing-informative generative model matrix for the most optimal generative model associated with that data synthetization intent.

Additionally, as shown in FIG. 1, in some embodiments, based on selecting/determining the generative model most optimal for processing a data synthetization query, the model arbiter 130 may function to instantiate (or load) that generative model from the model training and storage module 140 and/or pass at least a portion/subset of the transformed data synthetization query to that generative model.

1.40 Model Training & Storage Module

The model training and storage module 140 may function to train one or more generative models based on one or more training datasets sourced by the data sourcing module 150 and/or may comprise one or more on-premise or cloud-based databases that store data related to the training of the one or more generative models (e.g., model weights, model parameters, model metrics, model architecture, and/or the like).

In a preferred embodiment of the system 100, the model training and storage module 140 may train a plurality of distinct generative models. In such an embodiment, training the plurality of distinct generative models may include training one or more generative adversarial networks (GANs), one or more variational autoencoder (VAE) models, one or more auto-regressive models, and/or the like. It shall be noted that, when comparing the trained generative models against one another, the generative models may differ in architecture, training parameters ("hyperparameters"), be trained on different columns of the same dataset, be trained on different rows of the same dataset, and/or differ by other training conditions/techniques.

The model training and storage module 140 may additionally, or alternatively function to train and implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.50 Data Sourcing Module

The data sourcing module 150 may function to obtain or collect one or more corpora of training data from one or more subscriber-defined data sources. In some examples, the one or more subscriber-defined data sources may comprise one or more databases, one or more data warehouses, one or more data lakes, one or more subscriber-uploaded files, and/or the like. Accordingly, in such examples, the data sourcing module 150 may function to collect the one or more corpora training data by querying the subscriber defined data sources and/or by extracting data from the subscriber-uploaded files.

In some examples, the data sourcing module 150 may additionally, or alternatively, function to pre-process the one or more corpora of training data. In one non-limiting example, pre-processing the one or more corpora of training data may include collecting, from a subscriber, metadata information related to one or more data fields (e.g., columns) in the one or more corpora of training data. Furthermore, in other non-limiting examples, pre-processing the one or more corpora of training data may additionally, or alternatively, include computing statistical information about the data stored in the one or more data fields of the one or more corpora of training data and/or include performing one or more data cleansing actions on the one or more corpora of training data.

2. Machine Learning-Based Method for Query-Based Generation of Synthetic Datasets As shown in FIG. 2, a method 200 for on-demand generation of anonymized and privacy-compliant synthetic datasets includes sourcing training data (S210), training a plurality of generative models (S220), constructing a routing-informative generative model matrix (S230), instantiating a generative database (S240), and querying the generative database (S250).

2.10 Sourcing and Preprocessing Raw Training Data

S210, which includes sourcing training data, may function to obtain or collect one or more corpora of training data from a subscriber-defined data source. In a preferred embodiment, the corpus of training data may be sourced in response to (e.g., based on) the system 100 receiving a request to create a synthetic, privacy-protected derivation of the subscriber-defined data source. It shall be noted that, in some portions of the disclosure, this request may be referred to a "synthetization request," "subscriber-defined synthetization request," "user synthetization request," or the like.

In some examples, as will be described in more detail herein, a subscriber of a system or service implementing the method 200 may generate the synthetization request in order to comply with data protection laws, data usage laws, data dissemination laws, and/or industry standards (e.g., HIPAA) imposed on at least a subset of the data stored in the subscriber-defined data source. Additionally, or alternatively, in some examples, a subscriber of the system or service may generate the synthetization request to extend or enlarge a training data corpus, such as in scenarios where the subscriber-defined data source includes an insufficient amount of training data samples or unvarying data samples.

Querying for Training Data

In some embodiments, the subscriber-defined data source may comprise a database, data warehouse, data lake, and/or any other suitable data storage system/server. Accordingly, in such embodiments, S210 may function to source the corpus of training data by querying one or more database tables stored within the subscriber-defined data source. It shall be noted that, in some embodiments, if a subscriber has previously provided connectivity and query information to the subscriber-defined data source, S210 may function to obtain connection credentials of the subscriber-defined data source (e.g., hostname, database name, table name(s), username, password, etc.) and the (e.g., SQL or NoSQL) query to execute on the subscriber-defined data source via that provided connectivity information.

Alternatively, in some embodiments, if S210 determines that a subscriber has not previously provided such connectivity information, S210 may function to prompt for the connection credentials of the subscriber-defined data source and the query to execute on the subscriber-defined data source before (or contemporaneously with) the querying of the subscriber-defined data source.

Uploading Training Data

In some embodiments, the subscriber-defined data source may additionally, or alternatively, comprise a subscriber-provided file (e.g., a CSV file). Accordingly, in such embodiments, S210 may function to source the corpus of training data by extracting at least a subset of the data stored in the subscriber-provided file.

It shall be noted that, in some examples of the above-described embodiments, the data stored in the subscriber-defined data source may include privacy-sensitive data (e.g., patient health data, medical record data, and/or the like), confidential data (e.g., business operating data), and/or other types of privileged data. Thus, as will be described in more detail throughout the method 200, it may be advantageous for a subscriber to create statistically equivalent or statistically representative synthetic versions of the subscriber-defined data source such that analytical, machine learning, and/or other research-like tasks can be performed without exposing the sensitive data included in the original subscriber-defined data source.

Training Data Pre-Processing and Metadata Acquisition

In some embodiments, S210 may additionally, or alternatively, function to pre-process the sourced corpus of training data. In one non-limiting example, pre-processing the corpus of training data may include collecting, from a subscriber, metadata information related to each data field (e.g., column) in the corpus of training data. For instance, in a non-limiting example, S210 may function to receive one or more user inputs and/or one or more data structures, such as a .csv file or the like, indicating the data type of each data field or column in the corpus of training data (e.g., whether a respective data field relates to datetime data, string data, unique identifier data, currency data, numerical data, location data, Boolean data, or the like).

It shall be noted that, while the above example describes a scenario in which a subscriber provides contextual information about each column in the corpus of training data, S210, in some examples, may additionally, or alternatively, function to automatically determine the data types of the one or more data fields in the corpus of training data.

Additionally, or alternatively, in some embodiments, pre-processing the corpus of training data may include generating (or deriving) privacy-enabling metadata for the corpus of training data. In one example of such embodiments, deriving privacy-enabling metadata may include computing statistical information about the data stored in the data fields (e.g., columns) of the corpus of training data. This statistical information, in some embodiments, may provide a summary or overview of the data in these fields, which can be useful for understanding the data, for ensuring its privacy, and assessing likely synthetization performance of one or more generative models trained in S220.

For example, in some embodiments, S210 may compute the mean, median, mode, and/or range of the values in a data field. The mean provides an average value of the values in the data field, the median provides a middle value of the values in the data field, the mode provides the value that appears the greatest number of times in the data field, and the range provides the difference between the smallest and the greatest values in the data field. These statistical measures, in combination or alone, may provide a useful summary of the data in a field, without revealing individual data points, thereby enhancing privacy.

Additionally, or alternatively, in some examples, pre-processing the corpus of training data may include performing one or more pre-processing tasks to mitigate sensitive data leakage and/or to prevent inadvertent exposure of personally identifiable data. In one example of such embodiments, performing these one or more pre-processing tasks may include automatically detecting and removing PII data from the corpus of training data (e.g., removing columns matching SSN data patterns, phone number data patterns, email address data patterns, etc.), automatically detecting and correcting mislabeled inputs along a column or row, and/or the like.

2.20 Training Generative Machine Learning Models

S220, which includes training generative models, may function to train one or more generative models (e.g., an ensemble of generative models) based on the corpus of training data sourced in S210. In some examples, as will be described in more detail below, training generative models based on the corpus of training data sourced in S210 may enable such generative models, once trained, to produce/generate high quality synthetic data samples that are statistically representative of data samples included in the corpus of training data.

In a preferred embodiment, S220 may function to train a plurality of distinct subscriber-specific generative models that operate together to create one or more corpora of statistically-equivalent, de-identified training data samples. Additional technical benefits related to training a plurality of distinct generative models will be further described in greater detail in S230-S250. However, in general, training a plurality of distinct generative models may allow a generative database-such as the one instantiated in S240—to efficiently handle/process queries relating to a plurality of different data synthetization intents and a plurality of different synthetization queries.

In some embodiments, training the one or more generative models may include training one or more generative adversarial networks (GANs), one or more variational auto-encoder (VAE) models, one or more auto-regressive models, one or more diffusion transformer models, and/or the like. In some embodiments, each generative model may be trained independently of the others. Accordingly, in such embodiments, this independent training approach may allow for the generation of a diverse set of generative models, which can cater to a wide range of data synthesis requirements and use cases. Furthermore, it shall be noted that, when compared against one another, the generative models trained by S220 may differ in architecture, training parameters ("hyperparameters"), be trained on different columns of the same training data ("column subsetting"), be trained on different rows of the same training data, and/or differ by other training conditions/techniques.

Stated another way, in some embodiments, S220 may function to train collections of generators with capabilities of fulfilling queries about various subsets of the dataset sourced in S210. In one example of such embodiments, these collections of generators may be trained on arbitrary combinations of the data sourced in S210 by arbitrarily joining, merging, and/or selecting various database fields or tables underlying such data. Accordingly, if a generative database query received by S250 requests any combination of the specific data fields used during a training of one or particular sets of generative models, the method 200 may determine that these one or more particular sets of generators are capable of fulfilling such generative database query. However, if the generative database query received by S240 extends beyond the specific fields used during a training of one or more particular sets of generative models, these one or more particular set of generators may not be applicable to a subject generative database query as such generative models are not capable of synthesizing such data.

Furthermore, in some embodiments, training the one or more generative models may include applying learning constraints to the one or more generative models. Example learning constraints that may be applied to the one or more generative models during training may include, but should not be limited to, lower bound learning constraints for one or more data fields (e.g., columns) in the sourced training data, upper bound learning constraints for one or more data fields in the sourced training data, formulaic learning constraints between two or more data fields in the sourced training data, data field combination learning constraints, and/or the like. In a preferred embodiment, these example learning constraints may be obtained from a subscriber via a user interface provided by the system 100.

Additionally, or alternatively, in some embodiments, training the one or more generative models may include training the one or more generative models at a subscriber-designated computing location, such as at a subscriber-designated virtual private cloud (VPC) computing environment, a subscriber-designated public cloud computing environment, a subscriber-designated on-premise computing environment, and/or a combination thereof. Furthermore, it shall be noted that, in some embodiments, S220 may function to train the one or more generative models based on a subset of the training data sourced in S210 (e.g., 60%, 70%, 80%, 90%, etc. of the training data) while the remaining (unutilized) portions of the training data may be used for validating the trained generative models—as described in more detail in S230.

Figure 5:
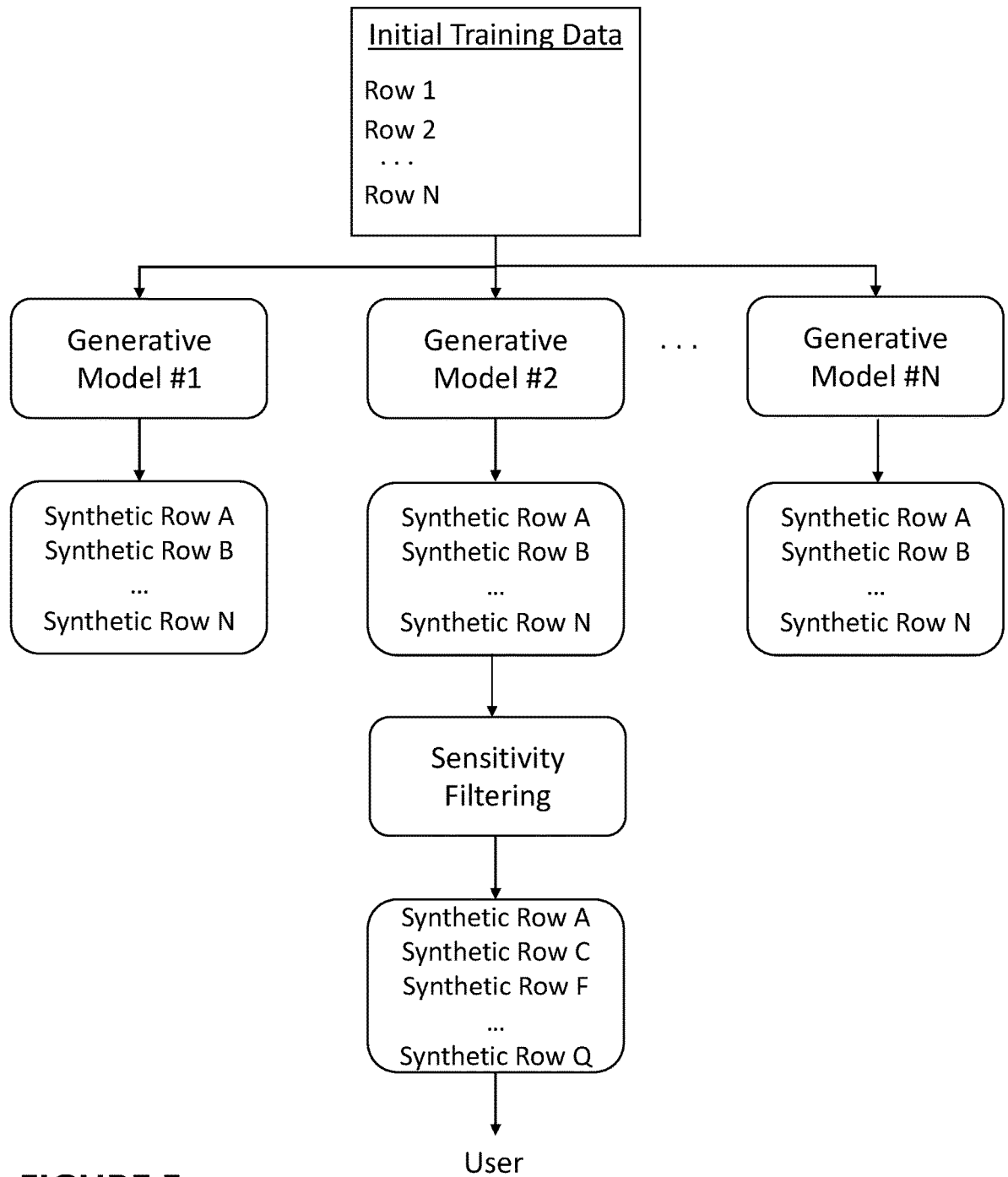
FIG. 5 illustrates an example schematic for training and evaluating generative models in accordance with one or more embodiments of the present application.

2.25 Synthetic Data Generation|Multi-Pass Sensitivity Filtering of Synthetic Datasets S225, which includes generating synthetic data samples, may function to generate one or more distinct corpora of synthetic data samples using the one or more generative models trained in S220 (as generally shown in FIG. 5). That is, once the generative models are trained using the sourced corpus of training data sourced in S210, S225 may instantiate or invoke each trained generative model of the target ensemble and, subsequently, cause each model to generate a respective corpus of synthetic data samples (e.g., a synthetic dataset). As an example, if the target ensemble of generative models trained in S220 includes ten (10) distinct generative models, S225 may function to cause each of the 10 generative models to produce at least one corpus of synthetic data samples.

Accordingly, in one or more embodiments, each generative model of a target ensemble may produce a corpus of synthetic data samples having a structure or characteristic(s) that may be substantially similar to the corpus of training data samples used in training a target generative model. For instance, in a non-limiting example, if a subject generative model is trained using training data samples stored in a tabular data structure (e.g., rows and columns), the subject generative model once instantiated for synthesizing data may function to generate synthetic data samples that conform to that tabular data structure.

Additionally, or alternatively, S225 may function to store, in memory, each distinct corpus of synthetic data samples generated by each distinct generative model in association with the corpus of (real) data samples used to train the distinct generative model. In this way, downstream dataset sensitivity and anonymization testing/evaluation can be performed, as will be described herein.

Synthetic Data Anonymization & Filtering

Additionally, or alternatively, S225 may include sensitivity filtering each corpus of synthetic data samples. In one or more embodiments, S225 may function to perform a multi-layered or multi-pass sensitivity testing on each distinct corpus of synthetic data samples to identify whether anonymization and/or privacy of the source training data samples (e.g., privacy-restricted data samples) is maintained in the synthetic datasets generated by each generative model of the target ensemble of generative models.

In a first implementation, S225 may function to perform granular sensitivity testing or evaluation of a given synthetic dataset that evaluates each distinct synthetic data sample for similarity or closeness to real data samples within a corpus of source training data samples. That is, in this first implementation, S225 may perform a similarity analysis that includes scanning or comparing a target synthetic data sample of a synthetic dataset against various real data samples of a corpus of source training data samples. In one embodiment, S225 may produce a resemblance or closeness metric or score based on each pairwise evaluation of the target synthetic data sample and each real data sample of a corpus of source training data samples. Accordingly, if the resemblance or closeness metric satisfies or exceeds a resemblance or similarity threshold (e.g., a maximum similarity value), S225 may jettison the target synthetic data sample from the synthetic dataset.

In a second implementation, S225 may function to perform a sensitivity testing or evaluation of a target synthetic dataset, as a whole, for re-identification risk based on data membership or attributes. In this second implementation, S225 may function to perform a sensitivity assessment across multiple synthetic data samples of the target synthetic dataset to identify or compute a re-identification metric. Preferably, the re-identification metric relates to a numerical or categorical value indicating a likelihood that one or more synthetic data samples may be re-identified to a real data sample based on an association to other synthetic data samples in a dataset or target corpus. Accordingly, if the re-identification metric satisfies or exceeds a re-identification risk threshold (e.g., a maximum re-identification risk value), S225 may jettison the target synthetic dataset together with the associated generative model that produced the target synthetic dataset.

2.30 Constructing a Data Synthesis Model Election Matrix

S230, which includes constructing a generative model election matrix, may function to create a data synthesis model election data structure (e.g., the generative model election matrix) based on computed efficacy metrics. The efficacy metrics, which may sometimes be referred to herein as model efficacy metrics, preferably relate to one or more distinct measures of a target generative model's capability in synthesizing accurate/representative data samples that may be both privacy-enabled and anonymized (i.e., de-identified).

In one or more embodiments, the generative model election data structure may be any suitable n-dimensional data structure that digitally associates model efficacy metrics data (e.g., area under the ROC curve (AUC) metrics, explainability metrics, feature importance metrics, accuracy metrics, precision metrics, error metrics, and/or the like) to a generative model for which the efficacy metrics were derived. In general, the generative model election data structure may be used to automatically elect one of the plurality of trained generative models to dynamically synthesize data for a data synthetization query received by a service implementing the method 200. That is, the generative model election matrix, in operation, may be used to dynamically inform an election or selection of the generative model(s) that may be most optimal for handling/processing a respective data synthetization query.

In one or more embodiments, the model efficacy metrics computed for a subject generative model may be derived indirectly through evaluation or testing of one or more machine learning models (e.g., classification models, regression models, and/or the like) that have been trained on at least one of the synthetic datasets produced by the subject generative model and one or more machine learning models that have been trained on real training data samples. Accordingly, the model efficacy metrics, in real terms, may be computed based on assessments of the predictive capabilities of the machine learning classifiers when trained on a corpus of synthetic data samples produced by a target generative model. That is, the model efficacy metrics of the machine learning models may be used as efficacy proxies for each distinct generative model represented within a generative model election matrix.

As previously described herein, each of the plurality of distinct generative models may produce a distinct corpus of synthetic data samples (e.g., synthetic data tables or datasets). Accordingly, in a preferred embodiment, S230 may, in turn, assess a viability and/or quality of each generative model included in a target ensemble by evaluating (comparing) outputs of a plurality of distinct machine learning models (e.g., classification models, regression models, and/or the like) trained on synthetic data samples against outputs of a plurality of distinct machine learning models trained on the real training data sourced in S210. In such a preferred embodiment, as will be described in more detail herein, the evaluation of the plurality of distinct machine learning classifiers may include deriving or computing one or more efficacy metrics informative of the predictive capabilities of machine learning models trained on the various synthetic datasets, deriving or computing one or more efficacy metrics informative of the predictive capabilities of machine learning models trained on the real training data sourced in S210, and/or include comparing the one or more efficacy metrics computed for machine learning models trained on the synthetic data samples and the one or more efficacy metrics computed for machine learning models trained on the real training data samples amongst one another.

Accordingly, in these embodiments, a logical flow for evaluating each trained generative model may be that the efficacy metrics computed for the one or more machine learning models (trained on synthetic data) may be informative of a quality of the synthetic dataset, and thus, informative of a quality and/or a capability of a generative model's ability to produce synthetic datasets that are statistically suitable for training machine learning classifiers while also being privacy-enabled and anonymized.

Additionally, or alternatively, the evaluation of the generative models may include evaluating each generative model for a plurality of likely data synthetization intents (or data synthetization request types). In some examples, S230 may additionally generate intent-specific metrics that may be used in constructing the generative model election matrix.

It shall be noted that, in some portions of the disclosure, a data generation intent (or a data synthetization intent) preferably relates to a likely intended use of the requested synthetic data once synthesized.

Efficacy Metrics Generation for Classification-Related Data Synthetization Intents In some embodiments, computing model efficacy metrics for a target generative model may include training a machine learning classifier using synthetic data samples produced by the generative model and, separately, training a distinct instance of the machine learning classifier using real data samples (preferably samples used in training the generative model). In such embodiments, a first efficacy metric, such as an F1 score or other similar model accuracy metric, may be computed for the machine learning classifier trained on the synthetic dataset and, distinctly, computed for the machine learning classifier trained on the real dataset. Accordingly, in such embodiments, the first efficacy metric may include a synthetic F1 score (or the like) and a real F1 score for the machine learning classifiers trained on the synthetic and real datasets, respectively.

In a variation of this embodiment, S230 may function to compute a derivative efficacy metric of the first efficacy metric by computing an absolute difference between F1 scores (or the like) of the two distinctly trained machine learning classifiers. The F1 score of the first machine learning classification model-optionally trained on synthetic data samples generated by the target generative model—may be computed based on its classification inferences generated on a validation (or holdout) dataset. In a similar manner, the F1 score for the second instance of machine learning classification model-optionally trained on the same dataset (i.e., real data samples) used to train the target generative model—may be computed based on its generated classification inferences on the same validation (or holdout) dataset.

Thus, in such examples, the method 200 may function to determine the generative model most suitable/optimal for classification-related tasks by comparing the first efficacy metric computed for each generative model trained in S220 amongst one another and selecting the generative model that has the lowest metric score (e.g., smallest difference in F1 scores) as the generative model most suitable/optimal for classification-related tasks.

Accordingly, in some embodiments, for each distinct data synthetization intent described herein, S230 may function to train a first instance of a target machine learning model on a synthetic dataset produced by a target generative model and a second instance of the target machine learning model on a real dataset derived from real data samples used in training the target generative model. In these embodiments, S230 may function to compute the first efficacy metrics (e.g., F1 scores) and derivative efficacy metrics based on the statistical evaluation of the performances of the first and second instance of the target machine learning classifiers and store the efficacy metrics in association with the distinct data synthetization intent a target generative model.

It shall be noted that, in some embodiments, the method 200 may additionally, or alternatively, function to determine the generative model most suitable for classification tasks by computing and comparing one or more other efficacy metrics in analogous ways described above, such as computing and comparing receiver operating characteristic (ROC) curve metrics, computing and comparing area under the ROC curve metrics (AUC), computing and comparing accuracy/precision metrics, computing and comparing feature importance metrics, computing and comparing error metrics, and/or the like.

Efficacy Metrics Generation for Regression-Based Synthetic Data Generation Intents Additionally, or alternatively, in some embodiments, computing model efficacy metrics for a target generative model may include training a machine learning regression model using synthetic data samples produced by the target generative model and, separately, training a distinct instance of the machine learning regression model using real data samples. In such embodiments, S230 may function to compute a second efficacy metric (e.g., a predictive error metric) to evaluate a target generative model's capability for generating synthetic datasets for training machine learning regression-based models (e.g., a second data synthetization intent).

In some embodiments, computing the second efficacy metric includes computing a predictive error metric, such as a mean squared error (MSE), based on observed regression values of a machine learning regression model trained on synthetic data samples produced by the target generative model and actual regression values of a machine learning regression model trained on real data samples. In a non-limiting example, the mean squared error or similar statistical estimation of error may be computed for the machine learning regression model trained on the synthetic data samples by using the predicted value of the machine learning regression model trained on the real data samples as a baseline or actual values.

Accordingly, in such examples, the method 200 may function to determine the generative model most suitable/optimal for regression-based tasks by comparing the second efficacy metric computed for each trained generative model amongst one another and selecting the generative model that has the lowest metric score (e.g., smallest difference in MSE scores) as the generative model most suitable/optimal for general-purpose tasks.

It shall be noted that, in some embodiments, the method 200 may additionally, or alternatively, function to determine the generative model most suitable for regression tasks by computing and comparing one or more other efficacy metrics in analogous ways described above, such as computing and comparing receiver operating characteristic (ROC) curve metrics, computing and comparing area under the ROC curve metrics (AUC), computing and comparing accuracy/precision metrics, computing and comparing feature importance metrics, computing and comparing error metrics, and/or the like.

Efficacy Metrics Generation for General-Purpose Tasks

Additionally, or alternatively, in some embodiments, evaluating the generative models trained in S220 may include evaluating the generative models for general-purpose tasks (e.g., a third data synthetization intent). In one example of such embodiments, S230 may function to evaluate the generative models for general-purpose tasks by computing a third efficacy metric ("histogram similarity") for each of the trained generative models.

In some embodiments, computing the third efficacy metric for a target generative model may include computing a distance between feature distributions in the actual/original training corpus (e.g., sourced in S210) and feature distributions in the data synthesized by the target generative model. It shall be noted that, in some embodiments, to compute a distance between feature distributions, S230 may function to utilize any suitable method including, but not limited to, Kullback-Leibler divergence, chi-squared, exponential divergence, Hellinger distance, Wasserstein distance, and/or the like.

Accordingly, in such examples, the method 200 may function to determine the generative model most suitable/optimal for general-purpose tasks by comparing the third efficacy metric computed for each generative model trained in S220 amongst one another and selecting the generative model that has the lowest metric score (e.g., smallest difference in distributions) as the generative model most suitable/optimal for general-purpose tasks.

It shall be noted that, in some embodiments, the method 200 may additionally, or alternatively, function to determine the generative model most suitable for general-purpose tasks by computing and comparing one or more other efficacy metrics in analogous ways described above, such as computing and comparing receiver operating characteristic (ROC) curve metrics, computing and comparing area under the ROC curve metrics (AUC), computing and comparing accuracy/precision metrics, computing and comparing feature importance metrics, computing and comparing error metrics, and/or the like.

Evaluating the Generative Models for Feature Modeling Tasks

Additionally, or alternatively, in some embodiments, evaluating the generative models trained in S220 may include evaluating the generative models for feature relationship modeling tasks (e.g., a fourth data synthetization intent). In one example of such embodiments, S230 may function to evaluate the generative models for feature relationship modeling tasks by computing a fourth efficacy metric ("synth_real_mape_coef") for each of the trained generative models.

In some embodiments, computing the fourth efficacy metric for a target generative model may include computing an absolute difference between mean absolute percentage squared error (MAPE) scores of two distinct machine learning-based models. In such embodiments, the MAPE score for the first machine learning-based model—optionally trained on synthetic data samples generated by the target generative model—maybe computed based on its predictive inferences generated on a validation (or holdout) dataset curated in S220. Similarly, the MAPE score for the second machine learning-based model—optionally trained on the same dataset used for training the target generative model—may be computed based on its predictive inferences generated on the same validation (or holdout) dataset.

Accordingly, in such examples, the method 200 may function to determine the generative model most suitable/optimal for feature relationship modeling tasks by comparing the fourth efficacy metric computed for each generative model amongst one another and selecting the generative model that has the lowest metric score (e.g., smallest difference in MAPE scores) as the generative model most suitable/optimal for feature relationship modeling tasks.

It shall be noted that, in some embodiments, the method 200 may additionally, or alternatively, function to determine the generative model most suitable for feature modeling tasks by computing and comparing one or more other efficacy metrics in analogous ways described above, such as computing and comparing receiver operating characteristic (ROC) curve metrics, computing and comparing area under the ROC curve metrics (AUC), computing and comparing accuracy/precision metrics, computing and comparing feature importance metrics, computing and comparing error metrics, and/or the like.

Column-Level Metrics

Furthermore, additionally or alternatively to the aforementioned embodiments, S230 may function to compute column-level metrics on the synthetic datasets provided by the generative models. In some embodiments, at least part of this computation may be performed when S250 receives a generative database query from a user. For instance, in a non-limiting example, if a user requests synthesized data for a set of columns, S230 may function to dynamically calculate column-level metrics for the synthetic datasets generated by a plurality of suitable generative models. These metrics may include various statistical measures, such as mean, standard deviation, a Chi-Square test, and/or the like to assess an efficacy of the synthetic data produced by a respective generator relative to real for a given column of the set of columns.

In some embodiments, once these column-level metrics are computed, S230 may further function to aggregate these column-level metrics into a single synthetization score. This synthetization score may then be used to rank suitable generative models, thus enabling selection of a generator most likely to provide the closest match to the real data for the requested columns.

2.35 Constructing the Generative Model Election Matrix

Additionally, or alternatively, in some embodiments, S235 may function to construct the generative model election matrix (also referred to herein as "generative model election data structure") based on values of the computed model efficacy metrics and model assessments. In one embodiment, S235 may deposit the model efficacy metrics computed for each respective generative model, synthetization objective, or synthetization intent as a dimensional entry into the generative model election matrix. As an example, an F1 difference score and a mean squared error (MSE) may be a first and second dimension or attribute of a target generative model and, thus, S235 may provide a first entry of a calculated F1 difference score and a second entry of a calculated MSE value in a logical association with the target generative model. In such an example, the F1 difference score and the MSE may be attributes or dimensions along one-dimensional axis of a matrix or table while a listing of each distinct generative model may be arranged along a second dimensional axis of the matrix or table.

It shall be recognized that the generative model election matrix or data structure may be a collection of matrices or data structures that may operate together when determining a generative model election. Accordingly, in a second non-limiting example, a generative model election matrix may be generated for each distinct data synthetization intent. Alternatively, S235 may function to collapse all the computed model efficacy metrics and data synthetization intents into a composite generative model election matrix.

Additionally, or alternatively, the generative model election matrix may include or contain a plurality of generative model-to-synthetization efficacy data nexuses or associations. Each generative model-to-synthetization efficacy data nexus, as generally referred to herein, may correspond to a distinct generative model and includes synthetization efficacy metrics that quantify the performance of the generative model in synthesizing data that is statistically representative of the target sensitive dataset.

In some embodiments, the generative model election data matrix may be configured to facilitate the identification of an appropriate generative model for fulfilling a generative database query. This may be achieved by searching the generative model election data matrix based on a generative model election request derived directly or indirectly from the generative database query. In such embodiments, the generative model election request may include synthetization-informative query parameters and a synthetization objective, which serve as election criteria for searching the generative model election data structure.

In some embodiments, the search process involves comparing the synthetization-informative query parameters and the synthetization objective with the synthetization efficacy metrics included in the generative model-to-synthetization efficacy data nexuses. In some embodiments, the search process may identify a generative model (or a group of generative models) whose synthetization efficacy metrics align the closest with the synthetization-informative query parameters and the synthetization objective. Accordingly, in some embodiments, this generative model may then be elected as the appropriate model for fulfilling the generative database query.

Additionally, or alternatively, in some embodiments, the generative model election data structure may include additional information about the generative models, such as their training parameters, the type of data (e.g., data fields) that they were trained on, and their performance on various synthetization tasks. This additional information can further aid in the selection of the appropriate generative model for fulfilling the generative database query, as described in more detail herein.

For instance, in a non-limiting example, the method 200 (e.g., via S250) may receive a generative database query such as "SELECT u.age, u.zip, u.income FROM users." In turn, based on receiving such generative database query, the method 200 may function to search the model election data matrix for generative models that were trained on data that enables the data fields "age," "zip," and "income" to be synthesized. The generative models that were not trained to generate these data fields may be deemed unsuitable and not considered for selection. Conversely, the suitable models trained on these data fields may then be ranked in one or more ways described herein (e.g., based on their performance on various synthetization tasks), and the model with optimal performance may be selected to fulfill the generative database query.

It shall be noted that by configuring a model election data matrix with generative model-to-synthetization efficacy data nexuses and facilitating the search for the appropriate generative model, this structure may enable the system to generate synthetic data that is statistically representative of the target sensitive dataset and suitable for the user's specific use case. Furthermore, in some embodiments, each generative model-to-synthetization efficacy data nexus within the generative model election data structure may include additional table-level synthetization efficacy metrics. These metrics, in some embodiments, may aggregate a distinct set of column-level synthetization efficacy metrics that are included in a target generative model-to-synthetization efficacy data nexus. Accordingly, in some embodiments, the generative model that is elected to fulfill a generative database query may correspond to either one of two options (e.g., the generative model that has the greatest table-level synthetization efficacy metric or the generative model that has the greatest aggregate column synthetization score).

2.40 Instantiating a Generative Database

S240, which includes instantiating a generative database, may function to construct/build a generative database that interfaces with one or more of the generative models trained in S220. The generative database instantiated by S240, in some examples, may be a memory-less or storage-less database that, when queried, synthesizes one or more data samples via an invocation of one or more generative models underpinning the generative database and, in turn, provides these synthesized data samples as a result to the query. Furthermore, in some embodiments, the generative database may comprise one or more distinct synthetic data tables that are individually queryable and/or may be a virtual representation of a two-dimensional structure (e.g., table) that does not store database records.

In some embodiments, S240 may function to instantiate the generative database based on or in response to receiving a request, from a subscriber, to build a synthetic representation/version of a subscriber-defined data source (e.g., a subscriber database). Accordingly, in such an embodiment and based on receiving the subscriber request, S240 may function to instantiate a generative database by performing one or more of the techniques/processes described in S210-S235. Furthermore, it shall also be noted that, in some examples, the data samples synthesized by the generative database may be artificial (e.g., fake) data samples that do not explicitly map in a one-to-one manner with the data samples included in the subscriber-defined data source.

Additionally, or alternatively, in some embodiments, instantiating the generative database may include digitally associating or linking the generative database to the generative models determined—in S230—to be most suitable/optimal for each type of data synthetization intent. For instance, in a non-limiting example, if S230 determined that a first, second, third, and fourth generative model are the most optimal generative models for a first, second, third, and fourth data generation intent, respectively, S240 may function to digitally link the first, second, third, and fourth generative models to the generative database. It shall be noted that, while the above non-limiting example describes a scenario in which four generative models are digitally associated with the generative database, S240, in other embodiments, may function to digitally link any number of generative models to the generative database without departing from the scope of the invention(s).

Additionally, or alternatively, in some embodiments, instantiating the generative database may include connecting the generative database to a public (or private) computer network (e.g., the World Wide Web)—thus enabling users to issue queries to the generative database. Connecting the generative database to the public or private computer network may include defining a hostname for the generative database, assigning a name/ID to the generative database, assigning names/IDs to the synthetic data tables encapsulated within the generative database, creating user credentials for a user (e.g., a username and password), and/or the like.

2.50 Implementing the Generative Database

S250, which includes implementing the generative database, may function to identify (or receive) one or more data synthetization queries directed to the generative database instantiated in S240. In a preferred embodiment, the one or more data synthetization queries received by S250 may comprise data synthesis commands, instructions, and/or parameters that indicate the amount of data (e.g., rows) to synthesize, the kind of data (e.g., columns) to synthesize, and/or the like. It shall be noted that, in some portions of the disclosure, a data synthetization query may be referred to as a "generative database query" or the like.

Query Translation|Query Transformation

In some embodiments, one or more of the data synthetization queries received by S250 may be Structured Query Language (SQL) queries. In such embodiments, since the generative database may be associated with a plurality of generative models (e.g., non-SQL processing models), S250 may function to translate (or transform) the one or more data synthetization queries to corresponding data synthetization requests (e.g., generative model election requests) that can be used for searching for generative models and, in turn, processed by a generative model underpinning the generative database.

In some examples, translating (or transforming) a data synthetization query to a suitable data synthetization request may include determining an intent of the data synthetization query. In one example of such embodiments, S250 may function to determine an intent of a data synthetization query by parsing the data synthetization query and extracting, based on the parsing, one or more attributes/properties of the data synthetization query. Example attributes/properties that may be extracted from the target data synthetization query may include, but may not be limited to, the name of the generative database being queried ("target generative database"), the name of the generative database table being queried ("target generative database table"), the database fields (e.g., columns) to synthesize, the number of data samples (e.g., rows) to synthesize, the conditions of the data synthetization query (e.g., WHERE clause in an SQL query), and/or the like.

Additionally, or alternatively, in some examples, translating the data synthetization query to a suitable data synthetization request may include identifying an intent of the user who executed the data synthetization query ("data synthetization intent"). In one preferred embodiment, to identify the data synthetization intent of a data synthetization query, S250 may function to display, to the user, a user interface provided by the system 100. The user interface provided by the system 100 may include a plurality of selectable user interface objects that are each associated with a different data synthetization intent (e.g., "explore a general-purpose dataset," "understand relationships between certain fields," "build a classifier," "predict/estimate a future value of a field," and/or the like).

Accordingly, in such a preferred embodiment, S250 may function to identify a data synthetization intent of the user based on a user interface object selected by the user. For instance, in a non-limiting example, if S250 receives an input selecting a user interface object associated with a first data synthetization intent, S250 may function to determine/identify that the data synthetization query corresponds to the first data synthetization intent. Conversely, if S250 receives an input selecting a user interface object associated with a second data synthetization intent, S250 may function to determine/identify that the data synthetization query corresponds to the second data synthetization intent.

It shall be noted that the above-described embodiments are not intended to be limiting and that S250 may collect the data synthetization intent of a user in other ways without departing from the scope of the disclosure contemplated herein. For instance, in one non-limiting example, S250 may function to identify the data synthetization intent of the user by parsing a target query parameter (e.g., SQL variable) included in the data synthetization query. The target query parameter may be a specific query parameter in the data synthetization query that indicates the intent of the user who executed the data synthetization query (e.g., "explore a general-purpose dataset," "understand relationships between certain fields," "build a classifier," "predict/estimate a future value of a field," and/or the like).

In another illustrative, non-limiting example, S250 may be configured to collect the data synthetization intent of the user through alternative interfaces such as a Command Line Interface (CLI) or an Application Programming Interface (API). These interfaces, while distinct from a Graphical User Interface (GUI), offer additional modalities for user interaction, thereby enabling S250 to accommodate a diverse array of user preferences and levels of technical expertise. For instance, a user may opt for a CLI or API in lieu of a GUI to exercise more direct control over the system or to automate specific tasks. Irrespective of the chosen interface, S250 is configured to accurately discern and interpret the user's data synthetization intent, all within the broad scope of the present disclosure.

It shall also be noted that, in some examples, as the user transmits new SQL-based queries to the generative database, the user may modify/change the data synthetization intent associated with each new SQL-based query (e.g., after querying the generative database with a query associated with a first data synthetization intent, the user may transmit, to the generative database, a new query associated with a different data synthetization intent).

Furthermore, in some embodiments, translating the data synthetization query to a suitable data synthetization request may include instantiating (or creating) a suitable model input data structure that can be provided as input to a generative model. In one example of such embodiments, creating the model input data structure may include adding, to the model input data structure, attributes identified from parsing the data synthetization query, such as the data fields (e.g., columns) to synthesize, the number of data samples to synthesize, and/or any other properties/attributes extracted from the data synthetization query.

Stated another way, in some embodiments, a model election request may be constructed in a manner such that it includes synthetization-informative query parameters and a synthetization objective. The synthetization-informative query parameters may relate to specific details extracted from the generative database query that provide information about the type of synthetic data to be generated. These parameters may include, for example, the specific columns of data that are to be synthesized, the desired number of synthetic data rows, or specific conditions for data synthesis.

The synthetization objective, on the other hand, may relate to a user-defined goal that guides the generation of the synthetic data. This objective could be related to a specific use case or task that the user intends to perform with the synthetic data. For instance, the user might specify that they intend to use the synthetic data for training a machine learning model, exploring feature correlations, or conducting a specific type of analysis. Thus, in some embodiments, the synthetization objective may provide a context for the generation of the synthetic data, enabling the system to produce data that is tailored to the user's specific requirements and use case.

Query Processing|Query Handling

Figure 3:
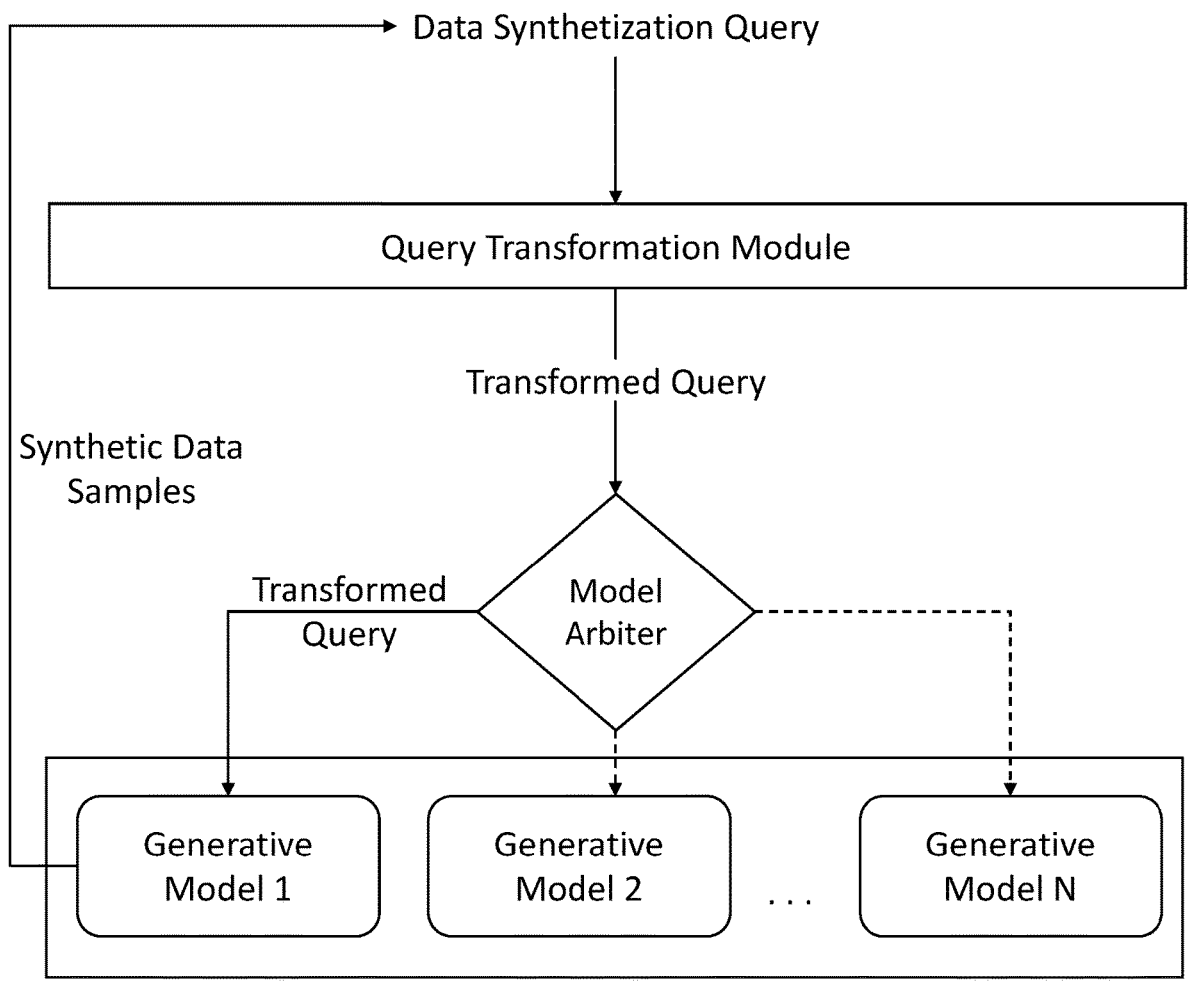
FIG. 3 illustrates an example schematic for generating a synthetic dataset in accordance with one or more embodiments of the present application.
Figure 4:
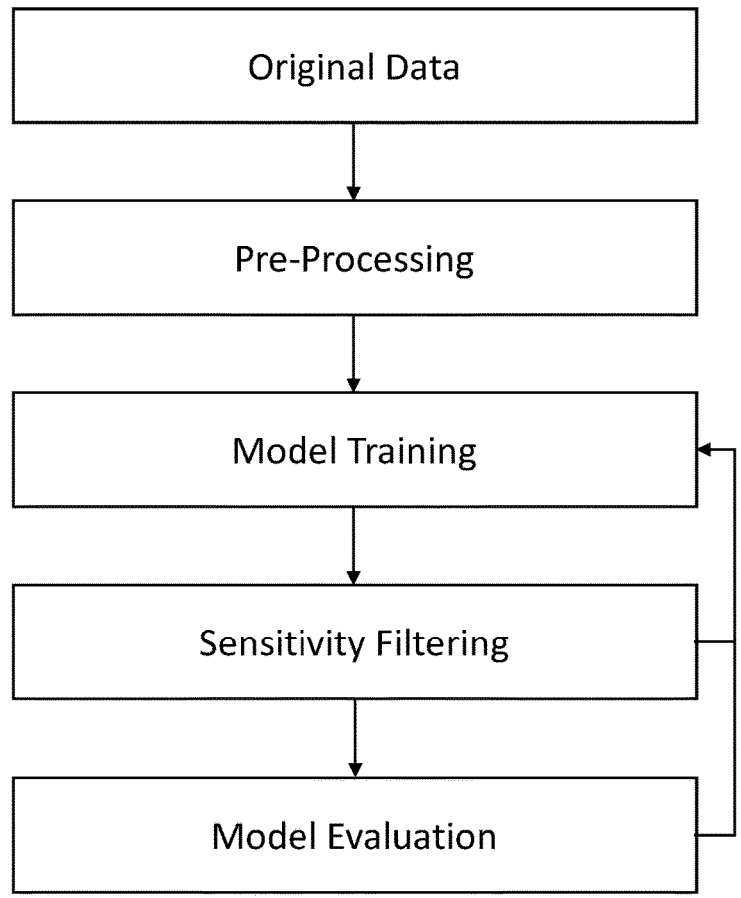
FIG. 4 illustrates an example process for configuring and implementing a generative database in accordance with one or more embodiments of the present application.
Figure 4:
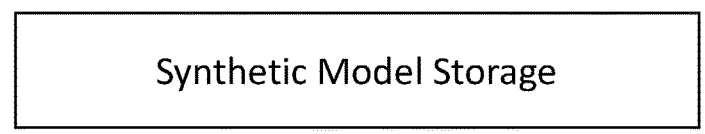
Figure 6:
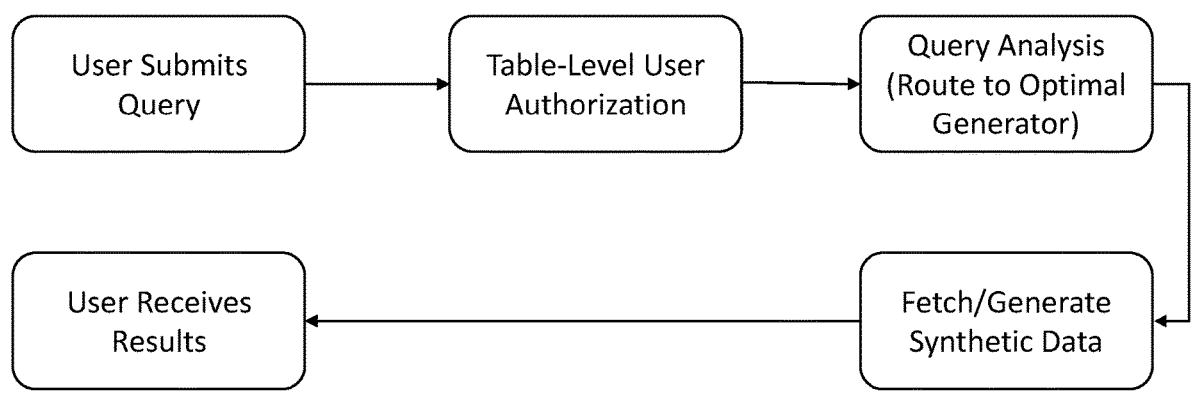
FIG. 6 illustrates an example process for querying a generative database in accordance with one or more embodiments of the present application.

Additionally, or alternatively, in some examples, based on receiving a data synthetization query, S250 may function to process the data synthetization query (as generally shown by way of example in FIGS. 3 and 6). In one embodiment, processing the SQL-based query may include identifying/determining which of the generative models underpinning the generative database is most suitable/optimal for processing the SQL-based query. In one example of such an embodiment, S250 may function to identify and/or elect the generative model most suitable/optimal for processing the data synthetization query by searching the generative model election matrix constructed for the generative database. Stated differently, in some embodiments, upon receiving the data synthetization query, the S250 may proceed to search the generative model election data structure that may contain generative model-to-synthetization efficacy data nexuses for identifying the generative model whose synthetization efficacy metrics align the closest with the synthetization-informative query parameters and the synthetization objective. This generative model, as described herein, may then be used to generate a synthetic dataset.

In some embodiments, searching the generative model election matrix may include identifying the data synthetization intent of the target data synthetization query (as described above) and searching the generative election matrix based on that data synthetization intent. If S250 finds a data synthetization intent-to-generative model pair matching the data synthetization intent corresponding to the data synthetization query, the search may return a name, storage address, virtual pointer and/or the like of the generative model paired to that data synthetization intent.

In turn, S250 may then function to provide the constructed model input data structure to the generative model returned from the search, which may subsequently cause that generative model to generate a synthetic dataset comprising synthesized data samples in accordance with the synthetization commands/instructions included in the provided input. It shall be noted that, in some examples, S250 may function to return the data samples synthesized by the generative model via the same query client (e.g., SQL client) that submitted the data synthetization query to the generative database (e.g., Tableau, pgAdmin, and/or the like).

In a second implementation, the generative model most suitable/optimal for processing the data synthetization query may be elected based on efficacy metrics that assess the performance of the generative models in generating synthetic data that accurately represents the original sensitive data. In some embodiments, the generative model with the greatest aggregate column synthetization score may be elected for fulfilling the query (e.g., generative database query).

In some embodiments, the aggregate column synthetization score may be a composite metric that quantifies the performance of a generative model in synthesizing data for a specific set of columns in the target sensitive dataset. This score, in some embodiments, may be computed by aggregating the synthetization efficacy metrics for the specific set of columns that are to be synthesized as specified in the generative database query. The synthetization efficacy metrics may include, for example, F1 scores, mean squared error (MSE), and histogram similarity scores, and/or other statistical measures such as mean, medium, mode, and/or the like.

In some embodiments, once the aggregate column synthetization scores are computed for all the generative models, S250 may proceed to elect the generative model with the greatest score for fulfilling the generative database query. This elected generative model may be deemed as the generative model that is most capable of generating synthetic data that is the closest in statistical representation to the original sensitive data for the specific set of columns specified in the query.

It shall be noted that, in some embodiments, the selection of the generative model may not be a static process but rather a dynamic one that is tailored to the specific requirements of the generative database query. This means that for different queries or even for different sets of columns within the same query, different generative models may be elected based on their respective aggregate column synthetization scores. Thus, in some embodiments, this dynamic model selection process may ensure that the synthetic data generated is not just statistically representative of the original sensitive data in general, but is specifically tailored to the particular requirements of the generative database query.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for on-demand generation of anonymized and privacy-compliant synthetic datasets, the method comprising:

identifying, via one or more computers, a generative database query for obtaining synthetic data samples statistically representative of a target sensitive dataset;

constructing, via the one or more computers, a generative model election request based on the generative database query, wherein the generative model election request, once constructed, includes (1) a plurality of synthetization-informative query parameters extracted from the generative database query and (2) a synthetization objective of the generative database query;

searching, via the one or more computers, a generative model election data structure comprising a plurality of generative model-to-synthetization efficacy data nexuses based on the generative model election request, wherein searching the generative model election data structure includes:

(i) defining, via the one or more computers, a generative model election search query using model election criteria derived from at least the synthetization objective and the plurality of synthetization-informative query parameters, (ii) searching, via the one or more computers, the generative model election data structure for one or more generative model-to-synthetization efficacy data nexuses that satisfy the model election criteria of the generative model election search query, and (iii) electing, via the one or more computers, a generative model for fulfilling the generative database query based on an assessment of synthetization efficacy data included in each of the one or more generative model-to-synthetization efficacy data nexuses;

generating, via the one or more computers, a synthetic dataset using the generative model elected for fulfilling the generative database query based at least on a subset of the plurality of synthetization-informative query parameters extracted from the generative database query, wherein the synthetic dataset, once generated, comprises the synthetic data samples statistically representative of the target sensitive dataset; and returning, via the one or more computers, the synthetic dataset as a result to the generative database query.

2. The method according to claim 1, wherein:

the plurality of synthetization-informative query parameters extracted from the generative database query comprise a set of synthetic data columns requested in the generative database query, each generative model-to-synthetization efficacy data nexus of the generative model election data structure (a) corresponds to a generative model trained on the target sensitive dataset and (b) includes column-level synthetization efficacy metrics for each synthetic data column that the generative model synthesizes, and electing the generative model from the one or more generative model-to-synthetization efficacy data nexuses includes:

identifying, in each of the one or more generative model-to-synthetization efficacy data nexuses, the column-level synthetization efficacy metrics that correspond to the set of synthetic data columns requested in the generative database query;

calculating a distinct aggregate column synthetization score for the generative model associated with each of the one or more generative model-to-synthetization efficacy data nexuses based on the identifying; and comparing the distinct aggregate column synthetization score calculated for the generative model corresponding to each of the one or more generative model-to-synthetization efficacy data nexuses; and electing a generative model with a greatest aggregate column synthetization score as the generative model for fulfilling the generative database query.

3. The method according to claim 2, wherein:

each generative model-to-synthetization efficacy data nexus includes a plurality of column-level synthetization efficacy metrics for each synthetic data column that a corresponding target generative model synthesizes, the plurality of column-level synthetization efficacy metrics associated with a target synthetic data column each correspond to a distinct synthetization objective of a plurality of synthetization objectives, and when the synthetization objective of the generative database query corresponds to a first synthetization objective, identifying the column-level synthetization efficacy metrics includes:

identifying, in each of the one or more generative model-to-synthetization efficacy data nexuses, column-level synthetization efficacy metrics that correspond to the first synthetization objective for the set of synthetic data columns requested in the generative database query; and calculating the distinct aggregate column synthetization score for the generative model associated with each of the one or more generative model-to-synthetization efficacy data nexuses based on the identifying of the column-level synthetization efficacy metrics that correspond to the first synthetization objective.

4. The method according to claim 3, wherein when the synthetization objective of the generative database query corresponds to a second synthetization objective, aggregating the column-level synthetization efficacy metrics includes:

identifying, in each of the one or more generative model-to-synthetization efficacy data nexuses, column-level synthetization efficacy metrics that correspond to the second synthetization objective for the set of synthetic data columns requested in the generative database query; and calculating the distinct aggregate column synthetization score for the generative model associated with each generative model-to-synthetization efficacy data nexus based on the aggregating of the column-level synthetization efficacy metrics that correspond to the second synthetization objective.

5. The method according to claim 2, wherein:

each generative model-to-synthetization efficacy data nexus of the generative model election data structure further includes table-level synthetization efficacy metrics that aggregate a distinct set of the column-level synthetization efficacy metrics included in a target generative model-to-synthetization efficacy data nexus, and the generative model elected for fulfilling the generative database query corresponds to one of: (1) a generative model with a greatest table-level synthetization efficacy metric or (2) the generative model with the greatest aggregate column synthetization score.

6. The method according to claim 1, wherein:

a generative database comprising a plurality of generative models receives the generative database query, each of the plurality of generative model-to-synthetization efficacy data nexuses digitally associates a distinct generative model of the plurality of generative models with distinct synthetization efficacy metric data that indicates a likely synthetization performance of the distinct generative model for a plurality of synthetization objectives, and the generative model elected for fulfilling the generative database query is selected from a set of the plurality of generative models having synthetization efficacy metric data satisfying at least a minimum generative model performance threshold for the synthetization objective of the generative database query.

7. The method according to claim 1, wherein:

the synthetization objective of the generative database query relates to a user intent with the synthetic dataset, the synthetization objective is sourced from a user associated with the generative database query via a graphical user interface, and the synthetization objective relates to at least one of:
- training a machine learning classification model using the synthetic dataset,
- training a machine learning binary classification model using the synthetic dataset,
- training a machine learning regression model using the synthetic dataset, and
- exploring one or more feature correlations within the synthetic dataset.

8. The method according to claim 1, wherein:

the generative database query comprises a plurality of generative query parameters specified in structured query language (SQL) syntax, the generative model election request, once constructed, further includes a name of a generative database and a name of a generative database table extracted from the SQL syntax, the method further comprising:
- identifying the generative model election data structure from a generative model election data structure registry based on a determination that the generative model election data structure includes generative model ranking data for the generative database and the generative database table.

9. The method according to claim 1, wherein:

a generative database service comprising a plurality of generative databases receives the generative database query via an application programming interface (API), and the plurality of generative databases of the generative database service are each associated with one or more generative database tables.

10. The method according to claim 1, wherein:

the target sensitive dataset comprises sensitive medical record data of one or more patients, the generative database query queries a generative database comprising a plurality of generative models trained on at least a subset of the sensitive medical record data, and the synthetic dataset provided as the result to the generative database query de-identifies and anonymizes the sensitive medical record data, thereby preserving patient privacy and confidentiality.

11. The method according to claim 1, wherein:

the plurality of synthetization-informative query parameters extracted from the generative database query specifies:
- a total number of synthetic rows to synthesize;
- a set of synthetic data columns to synthesize; and
- data synthesis conditions of the generative database query, and generating the synthetic dataset via the generative model elected for the generative database query includes:
- constructing a generative model input based on the total number of synthetic rows, the set of synthetic data columns, and the data synthesis conditions,
- providing the generative model input to the generative model, and
- generating the synthetic dataset based on the generative model receiving the generative model input.

12. The method according to claim 1, further comprising:

configuring a generative database to receive the generative database query, wherein configuring the generative database includes:
- sourcing, via the one or more computers, the target sensitive dataset from a user,
- training, via the one or more computers, a plurality of generative models based on the target sensitive dataset,
- constructing, via the one or more computers, the generative model election data structure based on a plurality of synthetization efficacy metrics computed for the plurality of generative models,
- associating, via the one or more computers, the generative model election data structure with the generative database, wherein the associating enables the generative database to search the generative model election data structure in response to receiving the generative database query, and
- defining, via the one or more computers, a generative database query interface that enables the user to submit the generative database query.

13. The method according to claim 12, wherein:

the generative database relates to a virtual representation of a data structure comprising one or more rows and columns that interfaces with at least a subset of the plurality of generative models trained on the target sensitive dataset to fulfill the generative database query, and the generative database dynamically generates the synthetic dataset by invoking the subset of the plurality of generative models with an input based on at least a subset of the plurality of synthetization-informative query parameters.

14. The method according to claim 12, wherein training the plurality of generative models on the target sensitive dataset includes:
- training a plurality of generative adversarial networks (GANs) on the target sensitive dataset, wherein at least a subset of the plurality of generative adversarial networks differ in at least one of model architecture, hyperparameters, and training data.

15. The method according to claim 12, wherein:

the generative database, once configured, synthesizes data samples for a plurality of synthetization objectives including a classification-related synthetization objective, and constructing the generative model election data structure includes:
- training a plurality of synthetic machine learning classifiers using synthetic data samples produced by a respective generative model of the plurality of generative models,
- training a distinct machine learning classifier using sensitive data samples included in the target sensitive dataset,
- determining a synthetic machine learning classifier of the plurality of synthetic machine learning classifiers that performs closest to the distinct machine learning classifier trained on the sensitive data samples, and
- selecting the respective generative model associated with the synthetic machine learning classifier that performs closest to the distinct machine learning classifier as an optimal generative model for the classification-related synthetization objective.

16. The method according to claim 15, wherein determining the synthetic machine learning classifier of the plurality of synthetic machine learning classifiers that performs closest to the distinct machine learning classifier trained on the sensitive data samples includes:

computing a plurality of synthetic F1 score model efficacy metrics for the plurality of synthetic machine learning classifiers trained on the synthetic data samples based on predictive inferences of the plurality of synthetic machine learning classifiers on a validation dataset derived from the target sensitive dataset, computing a raw data F1 score model efficacy metric for the distinct machine learning classifier trained on the sensitive data samples based on predictive inferences of the distinct machine learning classifier on the validation dataset derived from the target sensitive dataset, computing a plurality of derivative synthetization efficacy metrics based on a difference between the raw data F1 score model efficacy metric and a distinct one of the plurality of synthetic F1 score model efficacy metrics, and selecting a synthetic machine learning classifier associated with a smallest derivative synthetization efficacy metric as the synthetic machine learning classifier that performs closest to the distinct machine learning classifier trained on the sensitive data samples.

17. The method according to claim 12, wherein:

the generative database, once configured, synthesizes data samples for a plurality of synthetization objectives including a regression-based synthetization objective, constructing the generative model election data structure:
training a plurality of synthetic machine learning regression models using synthetic data samples produced by a respective generative model of the plurality of generative models, training a distinct machine learning regression model using sensitive data samples included in the target sensitive dataset, determining a synthetic machine learning regression model of the plurality of synthetic machine learning regression models that performs closest to the distinct machine learning regression model trained on the sensitive data samples, and selecting the respective generative model associated with the synthetic machine learning regression model that performs closest to the distinct machine learning classifier trained on the sensitive data samples as an optimal generative model for the regression-based synthetization objective.

18. The method according to claim 17, wherein determining the synthetic machine learning regression model of the plurality of synthetic machine learning regression models that performs closest to the distinct machine learning regression model trained on the sensitive data samples includes:

computing a plurality of synthetic mean squared error (MSE) model efficacy metrics for the plurality of synthetic machine learning regression models trained on the synthetic data samples based on predictive inferences of the plurality of synthetic machine learning regression models on a validation dataset derived from the target sensitive dataset, computing a raw data mean squared error (MSE) model efficacy metric for the distinct machine learning regression model trained on the sensitive data samples based on predictive inferences of the distinct machine learning regression model on the validation dataset derived from the target sensitive dataset, computing a plurality of derivative synthetization efficacy metrics based on a difference between the raw data MSE model efficacy metric and a distinct one of the plurality of synthetic MSE model efficacy metrics, and selecting a synthetic machine learning regression model associated with a smallest derivative synthetization efficacy metric as the synthetic machine learning regression model that performs closest to the distinct machine learning regression model trained on the sensitive data samples.

19. A computer-implemented method for generating synthetic datasets, the method comprising:

receiving, via an application programming interface (API) of a remote generative database service, a generative database query for obtaining synthetic data samples statistically representative of a sensitive dataset;

searching a generative model data structure comprising a plurality of generative model nexuses based on a generative model election request derived from the generative database query, wherein the searching returns a generative model for fulfilling the generative database query;

generating a synthetic dataset using the generative model returned from the searching based on a plurality of generative query parameters extracted from the generative database query; and returning the synthetic dataset as a result to the generative database query.

20. The method according to claim 19, wherein:

each of the plurality of generative model nexuses included in the generative model election data structure digitally associates a distinct generative model with model ranking data that ranks a likely synthetization performance of a plurality of generative models for a plurality of synthetization objectives, and the generative model elected from the searching of the generative model election data structure corresponds to a highest-ranked generative model for the synthetization objective of the generative database query.

* * * * *